United States Patent [19]

Nickell

[11] 3,897,239

[45] July 29, 1975

[54] USE OF PENICILLIN AS RIPENER FOR SUGARCANE

[75] Inventor: Louis G. Nickell, Honolulu, Hawaii

[73] Assignee: Hawaiian Sugar Planters' Association, Honolulu, Hawaii

[22] Filed: Mar. 28, 1974

[21] Appl. No.: 455,955

[52] U.S. Cl. ................................................ 71/90
[51] Int. Cl............................................. A01n 9/12
[58] Field of Search ......................................... 71/90

[56] References Cited
UNITED STATES PATENTS
2,749,230   6/1956   Kaplan..................................... 71/90

FOREIGN PATENTS OR APPLICATIONS
757,498   0000   United Kingdom

OTHER PUBLICATIONS

Nickell, Proceedings of the Society for Experimental Biology & Medicine, 80, 615–617, (1952).

Nickell, Antibiotics and Chemotherapy, 3, 449–459, (1953).

Nickell et al., Journal of Agricultural and Food Chemistry, 2, 178–182, (1954).

*Primary Examiner*—James O. Thomas, Jr.
*Attorney, Agent, or Firm*—Burns, Doane, Swecker & Mathis

[57] ABSTRACT

Sucrose yield of sugarcane is increased by treating the cane crop a few weeks prior to harvest with a ripening agent comprising penicillin.

9 Claims, No Drawings

USE OF PENICILLIN AS RIPENER FOR SUGARCANE

BACKGROUND OF THE INVENTION

As sugar is among the principal foods for man and animals, as well as a commercially important food for fermentation organisms, much research is being devoted to raising the sucrose yield of sugarcane in a variety of ways. In recent years this research has increasingly turned toward a search for chemical agents which effectively enhance the ripening of sugarcane and do so in a manner which is both safe and economical.

Some of the more successful chemical ripeners for sugarcane so far discovered are disclosed in U.S. Pat. Nos. 3,224,865; 3,245,775; 3,291,592; 3,482,959; 3,482,961; 3,493,361; 3,505,056; 3,660,072 and 3,671,219. Still other chemical agents which have been found successful or shown promise as sugarcane ripeners, such as cyclo-leucine, anisomycin and cycloheximide, are disclosed, for instance, in Hawaiian Planters' Record, Vol. 58, No. 5, pp. 71–79 (1970).

As is evident from these prior disclosures, the more active ripeners differ widely from each other in terms of chemical structure as well as chemical and biological properties. In the search for effective ripeners failures continue to outnumber successes by a wide margin. As of this date there is still no known screening test for determining the ripening activity of a compound other than to test it on maturing sugarcane. Moreover, because of toxicological or ecological concerns and the consequent possibility that rotation of use of different chemical ripeners in consecutive seasons in a given area may be preferable to the continued use of a single ripener or ripener mixture, the search for new sugarcane ripeners continues unabated.

Generally speaking, chemicals selected for evaluation as ripeners for sugarcane are those which have been previously found to exert some biological effect in the case of other plants, e.g., as plant hormones, non-hormonal herbicides, antifungal agents or antibiotics, growth inhibitors or, contrariwise, growth stimulants. However, among the compounds heretofore known to be useful for such other special and often contradictory purposes only an exceptional few are found to be effective in controlling the ripening of sugarcane in the desired manner.

No predictable relationship has yet been recognized between (a) the chemical structure of such compounds, (b) their phytotoxic effects, or (c) their physiological effects on the morphogenetic development of the plant, on the one hand, and their activity in having positive effects on ripening, on the other hand. Thus, for instance, among the sugar ripeners which have previously been found effective, both cycloheximide (an active antibiotic) and the mono-N,N-dimethyldodecylamine salt of endothal have a lethal action on the growth of duckweed even at a dosage of only 5 ppm while isoaureomycin strongly stimulates the growth of duckweed at all concentrations tested. Of all antibiotics known to have been heretofore tested for use as sugarcane ripeners, only cycloheximide and anisomycin are known to have been effective. However, their commercial use in the field has never been seriously considered because of their high cost and relatively high mammalian toxicity, especially to mucosa. Among other antibiotics and antimicrobial agents previously tested for use as sugar ripeners have been thiolutin, isonicotinic acid hydrazide, terramycin, beta-apoterramycin, lincomycin, tetracycline, aureomycin, polymixin-B, nalidixic acid, griseofulvin, tyrothricin, usnic acid and hadacidin, but none of these has produced a useful ripening effect.

OBJECTS OF THE INVENTION

It is an object of this invention to provide an antibiotic which is economically useful as a chemical ripening agent for sugarcane. A more general object is to increase the sucrose yield of sugarcane by chemically treating it during its maturation prior to harvest without introducing objectionable toxicological hazards. More specifically, it is an object of this invention to increase the sucrose yield of maturing sugarcane by treating a cane crop nearing its normal harvest period with a relatively inexpensive antibiotic which is sufficiently stable to provide the desired effect over a period of several weeks between application and a variable harvest date, but yet has a relatively low degree of persistence and is susceptible to autodecomposition or to decomposition by soil bacteria. A compound which increases the sucrose content only temporarily over a period of three weeks or less after application and then results in a substantial decrease is usually not a desirable chemical ripener except in situations where harvesting time can be rigidly programmed in advance in relation to the time of application of the chemical ripener.

SUMMARY OF THE INVENTION

According to the present invention the desired objectives have been achieved by the application of a ripening composition comprising penicillin or a salt of penicillin. More specifically, an excellent increase in sucrose yield has been obtained by applying a spray or dust comprising penicillin G, or a mixture of penicillins containing at least 85% by weight penicillin G admixed with other penicillins or salt forming metals or bases to maturing sugarcane stalks in a crop near the end of their normal maturation cycle, and harvesting such crops some weeks later. The composition is applied directly to the stalks by spraying, dusting or the like in order that it be deposited on the stalks including the younger, growing parts thereof. The normal maturation cycle of sugarcane under conditions such as those prevailing in Hawaii is from about 18 to about 36 months, though in some areas sugarcane is ripe and ready to harvest in 9 to 12 months.

The preferred usage form is a mixture containing the penicillin in an aqueous solution or suspension utilizing one or a combination of known surface active agents commonly and variously used in the prior art as wetting agents, detergents or emulsifying agents. However, dry dusting compositions containing penicillin and a solid diluent such as clay are also useful.

As is well known, "penicillin" is available in the form of a considerable number of different isomeric and closely related antibiotic compounds having outstanding antibacterial activity. Penicillin is obtained from the liquid filtrate of the molds *Penicillium notatum* and *Penicillium chrysogenum*, or by a synthetic process which includes fermentation. It can be represented by the formula $(CH_3)_2C_5H_3NSO(COOH)NHCOR$(bicyclic). Different varieties of penicillin which are useful in the present invention are produced biosynthetically by adding the proper precursor to the nutrient solution, such as corn steep and lactose, in which the mold is grown. Penicillin is commercially available in many well-established grades, e.g., penicillin G, in which the R that is attached to the 6-amino-penicillanic portion of the molecule is a benzyl radical; its water soluble alkali metal salts such as sodium, potassium and ammonium penicillin G; other metal salts such as calcium penicillin G and aluminum penicillin G; its slowly or sparingly soluble organic base salts such as benzathine penicillin G and procaine penicillin G; phenoxymethyl penicillin or penicillin V; allylmercaptomethyl penicillin or penicillin O; penicillins F, dihydro F, K and X, the various salts of such penicillins, mixtures of two or more such penicillins or penicillin salts. 6-aminopenicillanic acid and DL-penicillamine are also useful in the present invention. DL-penicillamine in particular has been found to be surprisingly effective as a sugarcane ripener, though the attractiveness of its use is at the moment limited by its present high cost. These and other known penicillins or penicillin derivatives are more fully described, for instance, in The Pharmacological Principles of Medical Practice by Krantz and Carr, 7th Ed., The Williams & Wilkins Company, Baltimore (1969), pp. 867–870, and elsewhere.

The possibility of using various antibiotics, penicillin salts among them, as food supplements and growth stimulants for radishes, oats, grass and plants in general, has been previously suggested. See, for instance, Nickell, "Stimulation of Plant Growth by Antibiotics," Proceedings of the Society for Experimental Biology and Medicine, 80, 615–617 (1952); Nickell, "Antibiotics in the Growth of Plants," Antibiotics and Chemotherapy, 3, 449–459 (1953); Nickell et al, "Antibiotics and the Effects on Plant Growth," Journal of Agricultural and Food Chemistry, 2, 178–182 (1954); British Patent (Nickell) 757,498; and U.S. Pat. No. 2,749,230. More particularly, for instance, it has been suggested that application of antibiotics such as water insoluble penicillin salts as fertilizer components or as additives in irrigation water will benefit vegetation by increasing the size or vigor of plants within a given period or will shorten the time required by the plants to reach normal maturity. However, the application of any penicillin compound directly to the maturing stalks of sugarcane or to any other plants for the purpose of increasing the resulting sugar yield or for any other purpose, has not been previously suggested.

The present discovery of the effective ripening activity of penicillin is astonishing, as most other antibiotics heretofore tested as potential sugarcane ripeners have been found to produce no useful effect in terms of a measurable or commercially measurable increase in the crop treated.

In accordance with this invention, a sugarcane crop which is nearing the normal maturity stage, e.g., a crop in Hawaii which is 18 to 36 months of age, is treated with the penicillin or with a composition containing same about two to ten weeks before harvest, the preferred time for treatment being between about four and ten weeks prior to harvest.

Good results are obtained when the sugarcane crop is treated at a rate in the range of from 1 to 4 pounds of penicillin G or equivalent penicillin containing composition per acre of sugarcane. However, higher rates (e.g., up to about 30 pounds of the antibiotic or more per acre) or rates lower than 1 pound per acre can also be used. The optimum amount will vary somewhat depending on the particular mode of application, environmental conditions, time of year, and age and variety of cane being treated, but can be readily determined for each particular case by preliminary testing.

The active agent is conveniently applied in the field in the form of an aqueous solution, emulsion or suspension, i.e., in a liquid composition which may be sprayed onto the maturing cane plants from a boom-spray, or it can be dusted on from an airplane or the like as a dust composition which contains the active compound diluted with an inert solid such as clay.

In preparing suitable liquid compositions, surface active agents of the type described, for instance, in U.S. Pat. No. 3,224,865, column 2, lines 61–66 or in U.S. Pat. No. 3,245,775, column 2, lines 57–64 are convenient to use. The preferred surfactants for use in liquid compositions of the present invention are those of the non-ionic type, e.g., alkyl phenoxy poly(ethyleneoxy)ethanols such as adducts of nonylphenol and ethylene oxide; trimethyl nonyl polyethylene glycol ethers; polyethylene oxide adducts of fatty and resin acids, and long chain alkyl mercaptan adducts with ethylene oxide.

With the type of boom-spray apparatus used in this work, it has been found convenient to apply the penicillin to the sugarcane field in the form of an aqueous solution, suspension or emulsion having a concentration of active agent such that the application at the rate of from 5 to 20 gallons of liquid composition per acre will provide the required dosage of active chemical. However, the use of lower or higher gallonages may be preferred when a different dispensing mechanism is used.

The preferred carrier for the active ripening agent is water to which about 0.1 to 2% by weight of surface active agent has been added. However, instead of using water as the carrier, non-phytotoxic mineral oils either as such or in the form of water-in-oil or oil-in-water emulsions may be used similarly in accordance with practices which are otherwise well known in the art of treating vegetation in the field with beneficial growth control agents. Excellent results are obtained when penicillin is present as essentially the sole active ingredient in the treating composition, but it may also be applied in combination with other ripeners.

DESCRIPTION OF SPECIFIC EMBODIMENTS

Example 1

Part A - Preparation of Treating Composition

A treating composition is prepared by weighing out 1 gram of potassium penicillin G and dissolving it in approximately 6 ml of water. This solution is diluted with water to exactly 8 ml, 1 drop of commercial Tergitol NPX (liquid) surfactant is added with a medicine dropper to the diluted penicillin solution. The solution is agitated by shaking prior to application.

Part B - Application of Penicillin Composition to Cane

A 0.3 ml dose of the aqueous solution containing 38 mg penicillin G, prepared as described in Part A above, was applied on the spindle area at the top of the last visible dewlap of each of 20 stalks of sugarcane in a test plot in a commercial cane field in Hawaii, using a syringe with a fine needle as a microapplicator.

Another group of 20 stalks in the same test plot were treated in an identical manner with "Trysben" (dimethylamine salt of 2,3,6-trichlorobenzoic acid), used as a standard because of its known and consistent good activity.

The age of the cane at the time of application was 23.75 months.

A set of 10 of these treated stalks from each group were harvested 4 weeks (28 days) after such treatment and another set of 10 were harvested about 5 weeks (37 days) after such treatment. At each harvest a set of 10 untreated stalks from the same plot were also harvested as a control.

The top 15 joints of each 10-stalk set of the treated stalks, as well as those of untreated control stalks from the same test plot, were removed, and each set was combined and analyzed in terms of juice purity and pol percent cane, following the so-called "press method" developed by T. Tanimoto, Hawaiian Planters' Record, 57, 133 (1964). "Pol percent cane" is a polarimetric determination and equals the percentage of sucrose if sucrose is the only optically active substance in the solution. In any event, determination of the pol percent cane is a standard and effective method for determining the sucrose content of sugarcane. The results are given in Table I.

The data show a major increase in sucrose yield in the cane which was treated with penicillin as compared with the untreated cane, and a significant increase even as against the cane which was treated with the standard ripener, Trysben. The improved effectiveness of penicillin vis-a-vis Trysben was particularly pronounced in the case of cane harvested 4 weeks after treatment although even after 5 weeks penicillin produced a substantially greater improvement than Trysben. Penicillin thus is shown to produce a high effect relatively quickly and yet to maintain it nearly constant over a considerable period. Both 4 weeks and 5 weeks after the application of the penicillin the sucrose yield available from the treated cane in this test was more than 35% greater than that available from the untreated control, and more than about 20% greater than that available from the Trysben treated lot.

TABLE I

| Cane Variety: | H50 - 7209 Field A | | | |
|---|---|---|---|---|
| Age: | 23.75 months | | | |
| Date of Treatment: | Oct. 13, Year X | | | |
| | Harvest Time After Treatment | | | |
| | 4 Weeks | | 5 Weeks | |
| Ripening Agent | Juice Purity | Pol % Cane | Juice Purity | Pol % Cane |
| Penicillin G 38 mg | 80.72 | 11.23 | 79.96 | 10.44 |
| Trysben (standard) | 67.84 | 7.65 | 76.21 | 8.72 |
| Control (untreated) | 67.97 | 7.72 | 70.46 | 7.70 |

TABLE II

| Cane Variety: | H59 - 3775 Field B | | | |
|---|---|---|---|---|
| Age: | 20.0 months | | | |
| Date of Treatment: | January 31, Year X + 1 | | | |
| Dates of Harvest: | February 28 and March 3 | | | |
| | Harvest Time After Treatment | | | |
| | 4 Weeks (28 days) | | 5 Weeks (35 days) | |
| Ripening Agent | Juice Purity | Pol % Cane | Juice Purity | Pol % Cane |
| Penicillin G 38 mg | 77.30 | 11.40 | 83.80 | 11.82 |
| Trysben (standard) | 79.23 | 9.75 | 82.15 | 10.99 |
| Control (untreated) | 78.34 | 9.73 | 79.26 | 9.93 |

TABLE III

| Cane Variety: | H50 - 7209 Field C | | | |
|---|---|---|---|---|
| Age: | 18.5 months | | | |
| Date of Treatment: | November 6, Year X + 1 | | | |
| Dates of Harvest: | December 4 and December 11 | | | |
| | Harvest Time After Treatment | | | |
| | 4 Weeks (28 days) | | 5 Weeks (35 days) | |
| Ripening Agent | Juice Purity | Pol % Cane | Juice Purity | Pol % Cane |
| Penicillin G 38 mg | 70.66 | 7.95 | 71.68 | 8.25 |
| Trysben (standard) | 77.01 | 9.02 | 62.32 | 6.42 |
| Control (untreated) | 57.22 | 4.97 | 64.19 | 6.33 |

EXAMPLE 2

Aqueous solutions of penicillin V and of DL-penicillamine, respectively, were at a later time prepared, applied to sugarcane, and evaluated following essentially the same procedures as described above in Example 1, and their effects were again compared with those of Trysben. The age of the cane at the time of application in this test series was 21 months.

The results of this test series are shown in Table IV below.

Both penicillin V and DL-penicillamine are seen to bring about an important increase in sugar yield. Moreover, their beneficial effect continued to increase to an important degree during the fifth week after application whereas the effect of Trysben declined during this interval in this test series as in some earlier series.

PART C

The effect of the ripener is of course somewhat dependent on the variety and age of the cane being treated, the amount of ripener applied, the atmospheric conditions between treatment and harvest time, and so on. This is illustrated by the data shown in Tables II and III above. In obtaining the data reported in these tables the same procedure was followed as that described in Part B, except that the field location, age and/or variety of the cane treated and the time of year were different, as indicated in the tables.

TABLE IV

| Cane Variety: | H50 - 7209 Field C | | | |
|---|---|---|---|---|
| Age: | 21 months | | | |
| Date of Treatment: | January 15, Year X + 2 | | | |
| Dates of Harvest: | February 12 and 19 | | | |
| | Harvest Time After Treatment | | | |
| | 4 Weeks (28 days) | | 5 Weeks (35 days) | |
| Ripening Agent | Juice Purity | Pol % Cane | Juice Purity | Pol % Cane |
| Penicillin V 38 mg | 71.10 | 8.12 | 78.88 | 11.56 |
| DL-Penicillamine 38 mg | 75.16 | 8.85 | 80.29 | 10.33 |
| Trysben (standard) | 73.05 | 9.16 | 69.40 | 8.61 |
| Control (untreated) | 66.76 | 7.34 | 66.03 | 7.15 |

The tabulated data show that in each test series the application of penicillin or its salt or derivative produce a very important increase in sucrose yield over that obtained in the untreated control and in the Trysben treated standard.

The data also show that penicillin compounds maintain their activity fairly constant over many weeks and that the benefits of the present invention can be obtained with similar effect at various stages of natural maturity of the cane at the time of treatment or harvest.

The nature, scope, utility and effectiveness of the present invention have been described and exemplified in the foregoing specification. However, these examples are not intended to be limiting and the true scope of the invention which is entitled to patent protection is particularly pointed out in the appended claims.

What is claimed is:

1. A process for modifying the ripening of field grown sugarcane plants so as to increase its yield of sucrose which comprises applying penicillin in a sucrose increasing amount directly to the cane plants at a time from 2 to 10 weeks prior to harvest.

2. A process according to claim 1 wherein penicillin is sprayed onto the cane plants as a liquid composition containing water as a carrier.

3. A process according to claim 1 wherein the penicillin is penicillin G and is applied to the cane plants as an aqueous solution or suspension at the rate of 5 to 20 gallons of aqueous composition per acre.

4. A process according to claim 1 wherein the penicillin is penicillin V and is applied to the cane plants as an aqueous solution or suspension at the rate of 5 to 20 gallons of aqueous composition per acre.

5. A process according to claim 3 wherein the aqueous composition contains between 0.1 and 2% by weight of a surface active agent.

6. A process according to claim 3 wherein the aqueous composition contains between 0.1 and 2% by weight of a nonionic surface active agent.

7. A process according to claim 3 wherein the penicillin is dissolved in the aqueous composition as a water soluble salt.

8. A process according to claim 3 wherein the penicillin is suspended in the aqueous composition as a substantially insoluble salt.

9. A process according to claim 3 wherein the cane plants are between 9 and 36 months of age and nearing normal maturity when the penicillin is applied thereto.

* * * * *